US007060344B2

(12) United States Patent  
Pourdeyhimi et al.

(10) Patent No.: US 7,060,344 B2  
(45) Date of Patent: Jun. 13, 2006

(54) THREE-DIMENSIONAL DEEP MOLDED STRUCTURES WITH ENHANCED PROPERTIES

(75) Inventors: Behnam Pourdeyhimi, Cary, NC (US); Trevor J Little, Cary, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/771,924

(22) Filed: Feb. 4, 2004

(65) Prior Publication Data

US 2004/0224133 A1 Nov. 11, 2004

Related U.S. Application Data

(60) Provisional application No. 60/467,943, filed on May 5, 2003.

(51) Int. Cl.
*B32B 1/00* (2006.01)
*D02G 3/00* (2006.01)
*D04H 3/06* (2006.01)

(52) U.S. Cl. .................. 428/175; 428/374; 428/401; 442/328

(58) Field of Classification Search ............... 428/156, 428/175, 178, 212, 374, 401; 442/328, 182
See application file for complete search history.

(56) References Cited

U.S. PATENT DOCUMENTS

| | | | | |
|---|---|---|---|---|
| 4,741,941 A | * | 5/1988 | Englebert et al. | 428/71 |
| 4,863,779 A | * | 9/1989 | Daponte | 428/152 |
| 5,165,979 A | * | 11/1992 | Watkins et al. | 428/113 |
| 5,731,062 A | * | 3/1998 | Kim et al. | 428/175 |
| 5,993,943 A | * | 11/1999 | Bodaghi et al. | 428/198 |

OTHER PUBLICATIONS

Notification of Transmittal of International Search Report and Written Opinion of the International Searching Authority, Sep. 30, 2004.

* cited by examiner

*Primary Examiner*—Donald J. Loney
(74) *Attorney, Agent, or Firm*—Jenkins, Wilson, Taylor & Hunt, P.A.

(57) ABSTRACT

A three-dimensional deep molded structure made from planar knits or wovens composed of homo-component, bicomponent or multi-component fibers having a fiber diameter of less than 100 microns and nonwovens composed of fibers or filaments of any size. Most suitably, nonwovens with a random fiber orientation distribution and a high degree of crimp with partially oriented fibers are preferred for use in forming the deep molded structure.

35 Claims, 9 Drawing Sheets

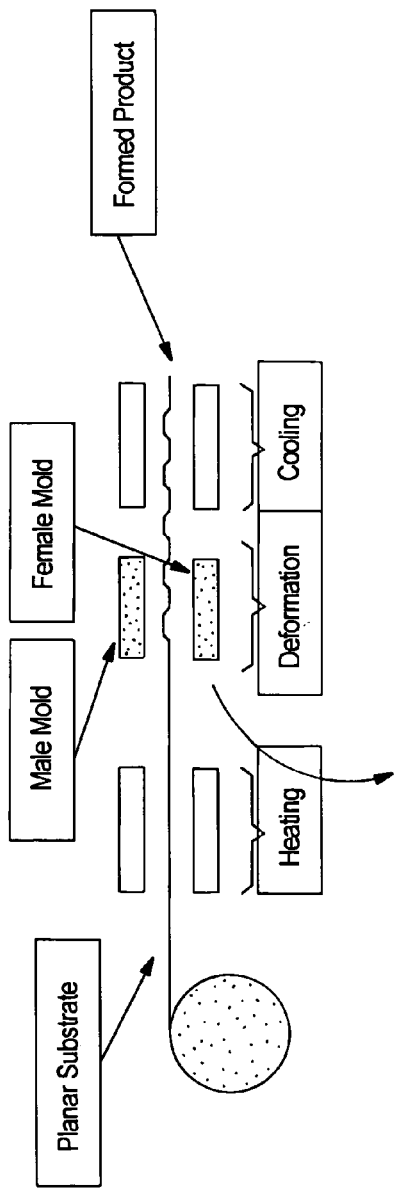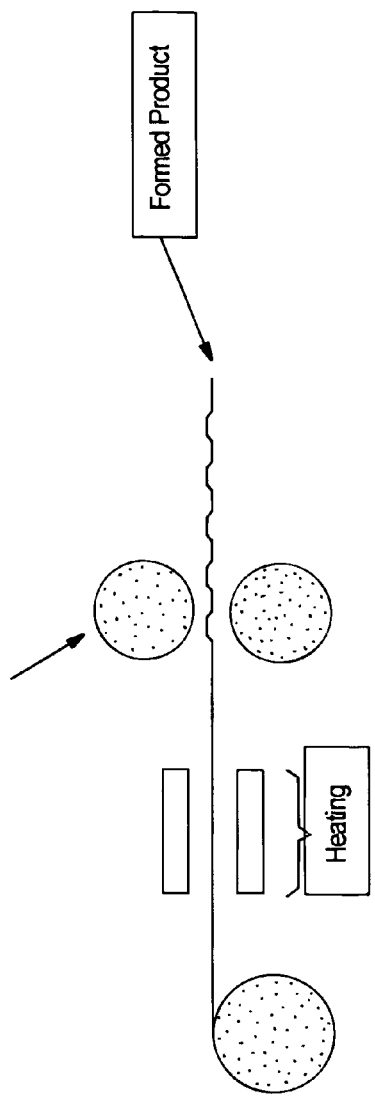
FIG. 2A
FIG. 2B

THREE-DIMENSIONAL DEEP MOLDED STRUCTURES WITH ENHANCED PROPERTIES

RELATED APPLICATIONS

This application claims the benefit of U.S. Provisional Patent Application Ser. No. 60/467,943, filed May 5, 2003, the disclosure of which is incorporated herein in its entirety.

FIELD OF THE INVENTION

The present invention relates to three-dimensional molded structures preferably comprising of a nonwoven substrate formed of small diameter fibers and/or filaments.

BACKGROUND ART

Three-dimensional molded nonwoven structures are used in a variety of applications. Most notably, automotive parts account for a great majority of such applications including headliners, door liners, carpets, and the like. Most of these structures however, are molded to conform to the shape of the object they surround or support. The degree to which the fibers in the structure are extended is somewhat limited. Furthermore, these structures are molded to a given shape and recovery from extension or compression is not a concern. Many nonwovens that are used in these applications are composed of fibers that have the ability to be drawn further during the molding process to accommodate the shapes required without being ruptured. For example, spunbonded structures composed of fibers that are not fully drawn during the fabric manufacturing process make ideal candidates for such molding applications. Most other structures however, do not readily lend themselves to molding and often rupture during the molding process.

Another area of molding relates to honeycomb-like structures that are intended as compression supports in various structures including automotive seats, sports shoes and the like. These, however, use woven and knitted structures manufactured by intersecting or interlooping heavy monofilament fibers to achieve the desired properties.

Representative related art in the technology of the invention includes the following patent references: U.S. Pat. No. 2,029,376; U.S. Pat. No. 2,627,644; U.S. Pat. No. 3,219,514; U.S. Pat. No. 3,691,004; U.S. Pat. No. 4,104,430; U.S. Pat. No. 4,128,684; U.S. Pat. No. 4,212,692; U.S. Pat. No. 4,252,590; U.S. Pat. No. 4,584,228; U.S. Pat. No. 5,731,062; U.S. Pat. No. 5,833,321; U.S. Pat. No. 5,851,930; U.S. Pat. No. 5,882,322; U.S. Pat. No. 5,896,680; U.S. Pat. No. 5,972,477; U.S. Pat. No. 6,007,898; and U.S. Pat. No. 6,631,221. The teachings of these prior art references are incorporated by reference herein.

The present invention is intended to overcome many of the well-known deficiencies of prior art deep molded structures and to meet a long-felt need for a new and improved material that possesses unique properties.

SUMMARY OF THE INVENTION

Applicants have discovered deep molded three-dimensional structures fabricated from flat planar nonwoven substrates of various types in a variety of shapes. The present invention comprises a deep molded structure that is made from nonwovens comprising filaments or staple fibers of any size to create the nonwoven structure. Additionally, the present invention could comprise a deep molded structure that is made from knitted or woven materials comprising filament or staple fibers smaller than 100 microns in diameter. The fibers in all structures can be homo-component or multi-component as in sheath-core, side-by-side, striped, tipped trilobal, segmented-pie, and others.

The structure can be high in porosity or can be quite dense. The key to the invention for a wide range of products is to ensure that during the heating process, the fibers approach their onset of melting and are only partially melted. This invention also anticipates structures formed from complete melting of the fibrous structure which will result in a structure that does not have much resilience and will form a rigid structure used as a spacerfabric and the like. The structure relies on the thermoplastic components in the structure for moldability. However, the structure may be composed of both thermoplastic and non-thermoplastic components as well. The drawing characteristics of the constituent fibers are important as is the process for molding the structure. The structures are formed by a combination of heat and pressure such as those commonly used in solid phase pressure forming, vacuum bladder match plate molding, stamping, pressing or calendaring.

It is an object of the present invention to provide a nonwoven planar material comprising small diameter filaments or staple fibers to permanently form a multiplicity of raised projections from the plane of the nonwoven material.

It is another object of the present invention to provide a knitted or woven planar material comprising small diameter staple fibers or filaments molded to permanently form a multiplicity of raised projections from the plane of the material.

It is another object of the present invention to provide a deep molded structure wherein the local structure (from the raised portions to the depressions) retains its textile nature and remains functional.

It is another object of the present invention to provide a deep molded structure wherein the planar structure to be molded can be selected from a variety of nonwovens but wherein a component in the structure must be thermoplastic.

It is another object of the present invention to provide additional stiffness to the deep molded structure by laminating or joining another planar substrate to the deep molded structures.

It is still another object of the present invention to provide additional stiffness to the deep molded structure by nesting two or more deep molded structures face-to-face or face-to-back.

It is another object of the present invention to provide additional properties to the deep molded structure by adding thermosetting resins, fibrous and non-fibrous coatings, and functionality such as electroactivity, waterproofing, mildew resistance, barrier materials, layer-shedding, and the like.

Some of the objects of the invention having been stated other objects will become apparent with reference to the detailed description and the drawings as described hereinbelow.

DESCRIPTION OF THE DRAWINGS

FIGS. 2A, and 2B are schematic views of two representative processes making use of (1) flat sheet molding and (2) calendar molding, respectively;

DETAILED DESCRIPTION OF THE INVENTION

Figure 1B:
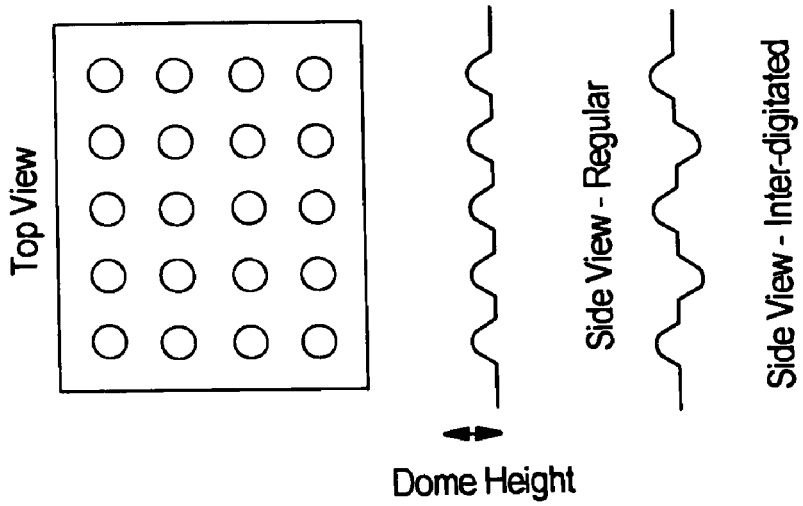
FIGS. 1A, and 1B are schematic views of two representative deep molded structures.
Figure 1A:
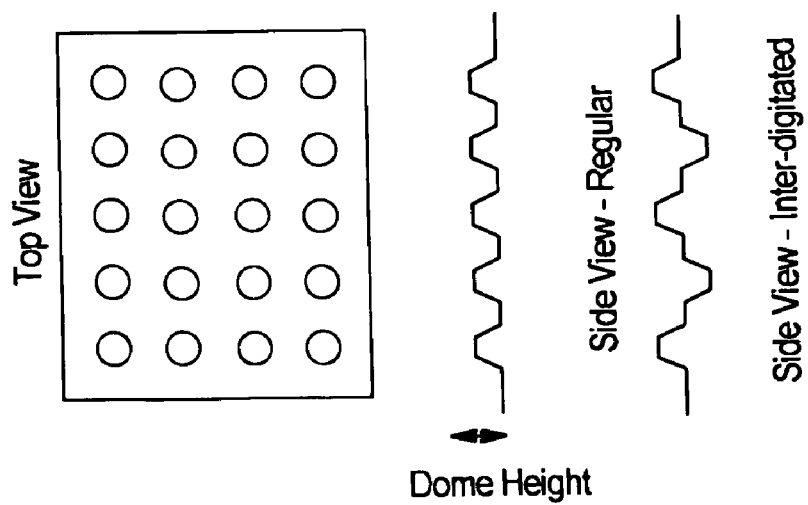

The invention is a deep molded nonwoven structure comprising filaments or staple fibers having a diameter of any suitable size. Applicants also contemplate that the novel structure could be formed from knitted and woven fabrics comprising fibers and/or filaments measuring less than 100 microns in staple fiber or filament diameter. This provides a deep molded structure that retains its textile like hand, but will have significantly different texture and three-dimensionality as well as resilience and compression recovery. The three-dimensional textile structure has improved functionality with respect to heat and moisture management, small particle management, detection and decontamination of hazardous agents, force and impact management, air circulation, personal protection, personal comfort in transportation and confinement.

Natural and synthetic textile fibers are available in a wide range of cross-sectional shapes including, circular, triangular, multi-lobed, ribbon, hollow, irregular and the like. While measuring fiber diameter is a common means of describing fibers with circular cross-section, it is often necessary to measure fiber dimensions other than the diameter. In the case of trilobal cross-sections, the longest fiber dimension would be along an edge forming the trilobal cross-section or in the case of ribbon fibers, the cross-section would have two distinct measures (width and thickness). The intended invention may use fibers of any cross-sectional shape and have a size less than 100 microns in diameter (e.g., a round cross-section fiber of 80 microns in diameter) or wherein at least one of the principal dimension is less than 100 microns (e.g., a ribbon fiber of 100 microns×10 microns).

FIGS. 1A, 1B and 2A, 2B show typical products and processes that can be used for making these deep molded structures. The manufacturing starts with a specific planar fabric. These fabrics are then stabilized and thermo-formed to create the three-dimensional novel structure of the invention. Multiple layers or composites can be constructed after the thermo-forming stage as a matter of choice. The thermoforming process can use conventional sheet thermo-forming equipment (FIG. 2A) or calendar molding equipment (FIG. 2B), and typical processes are shown in FIGS. 2A and 2B.

In a nonwoven substrate, a number of structure variables can be controlled to form the desired structure. In particular, fiber orientation distribution (ODF), fiber crimp and fiber diameter are important controlling elements. The ODF $\psi$ is a function of the angle $\theta$. The integral of the function $\psi$ from an angle $\theta_1$ to $\theta_2$ is equal to the probability that a fiber will have an orientation between the angles $\theta_1$ to $\theta_2$. The function $\psi$ must additionally satisfy the following conditions:

$$\psi(\theta+\pi)=\psi(\theta)$$

$$\int_0^\pi \psi(\theta)d\theta = 1$$

To describe the alignment of the fibers, applicants use a ratio known as the Anisotropy Radio, $f_p$ defined as:

$$f_p = 2\langle\cos^2\theta\rangle - 1$$

$$\langle\cos^2\theta\rangle = \frac{\int_0^\pi \psi(\theta)\cos^2(\theta_{ref} - \theta_i)d\theta}{\int_0^\pi \psi(\theta)d\theta}$$

The anisotropy parameter varies between −1 and 1. A value for $f_p$ of 1 indicates a perfect alignment of the fibers parallel to a reference direction and a value of −1 indicates a perfect perpendicular alignment to that direction. $f_p$ is zero for a random assembly. The degree of moldability changes with the structure's anisotropy. The best structures for the current inventions are obtained when the nonwoven structure is random or when $f_p=0$ or very close to 0. Nonwoven substrates suitable for molding generally have a value for $f_p$ between −½ to ½.

Note that an increase in fiber crimp will also result in improved moldability. This occurs because an increase in crimp increases the degree to which the structure may be drawn. Fiber diameter is important in determining and controlling the structure because it affects stiffness and porosity properties.

The present invention most suitably uses filaments, and/or fibers having a diameter less than 100 microns, and preferably about 1–20 microns, to form the nonwoven, woven, or knitted substrate thereof. Applicants surprisingly discovered that use of a nonwoven substrate formed from such small diameter fibers results in highly resilient three-dimensional structure without adversely affecting the surface properties of the base material. Additionally, these structures can recover well from repeated compression and retain their shape and three-dimensionality. The present invention also contemplates using filaments, and/or fibers having a diameter greater than 100 microns to form a significantly more rigid nonwoven. Applicants surprisingly discovered that such rigid nonwoven structures are also resilient and have significant recovery from compression.

The same has also been found to be the case with wovens and knits formed in accordance with the invention from the small diameter fibers and/or filaments.

Thermo-forming of nonwoven substrates is accomplished through a combination of two material phenomena: (1) rheological and (2) mechanical deformation. Rheological deformation implies that a certain amount a molecular movement is induced though the application of heat to the substrate thus softening the fiber to the point of laminar movement. To maintain fibrous characteristics without considerable change to molecular orientation and crystallinity, the forming temperature must be maintained to be above the glass transition and below the melting temperature (e.g., thermoplastic fibers or polymers have a melting temperature between 70–450° C.). Fibers used in thermo-forming nonwoven substrates can include (co-poyetherester elastomer, poly (ethylene terephthalate), poly (trimethylene terephthlate), nylon 6, nylon 6,6, polypropylene, polyethylene, polyesters, polyamides, thermoplastic co-polyetherester elastomers, polyolefines, polyacryonitriles, polyacrylates and thermoplastic liquid crystalline polymers); they can be homo-component, bi-component or multi-component; and they can be tipped trilobal, side by side or sheath/core wherein one component melts at a lower temperature. In thermo-forming involving deep draws, four fundamental modes of mechanical deformation are observed. These are in-plane tension, transverse compression, in-plane shear and out-of-plane bending. The complexity in mechanical deformation will vary with the complexity of the molds used during the thermo-forming process.

The present invention differs from other molded structures in that the total drawing of the substrate is significant both locally and in the bulk. Applicants use the term "drawability" to express the largest possible draw ratio or limiting draw ratio obtained before failure occurs. For the present invention, the draw ratio is defined as the surface area of the formed product to that of the substrate. Specifically, the surface area at which failure occurs could be used to determine the limiting draw ratio of the substrate with the following equation:

$$DR = \frac{A_{SF}}{A_I}$$

Where the initial surface area ($A_I$) is the pre-molding area and the final surface area ($A_{SF}$) is the increase in surface area achieved post molding. To demonstrate the extent to which the substrate is drawn, applicants use the frusto-conical dome geometry shown in FIG. 3. In determining the Draw Ratio, several assumptions are made. It is assumed that a perfect grid of "domes" of right circular cones normal to the substrate plane describe the geometric shape produced utilizing a male/female mold geometry.

Applicants have discovered that fibers and/or filaments used to form the substrate normally achieve a better result during the molding process if the fibers and/or filaments are partially oriented fibers and/or filaments. This has been shown to achieve substantially improved fiber and/or filament orientation after molding.

Figure 3:
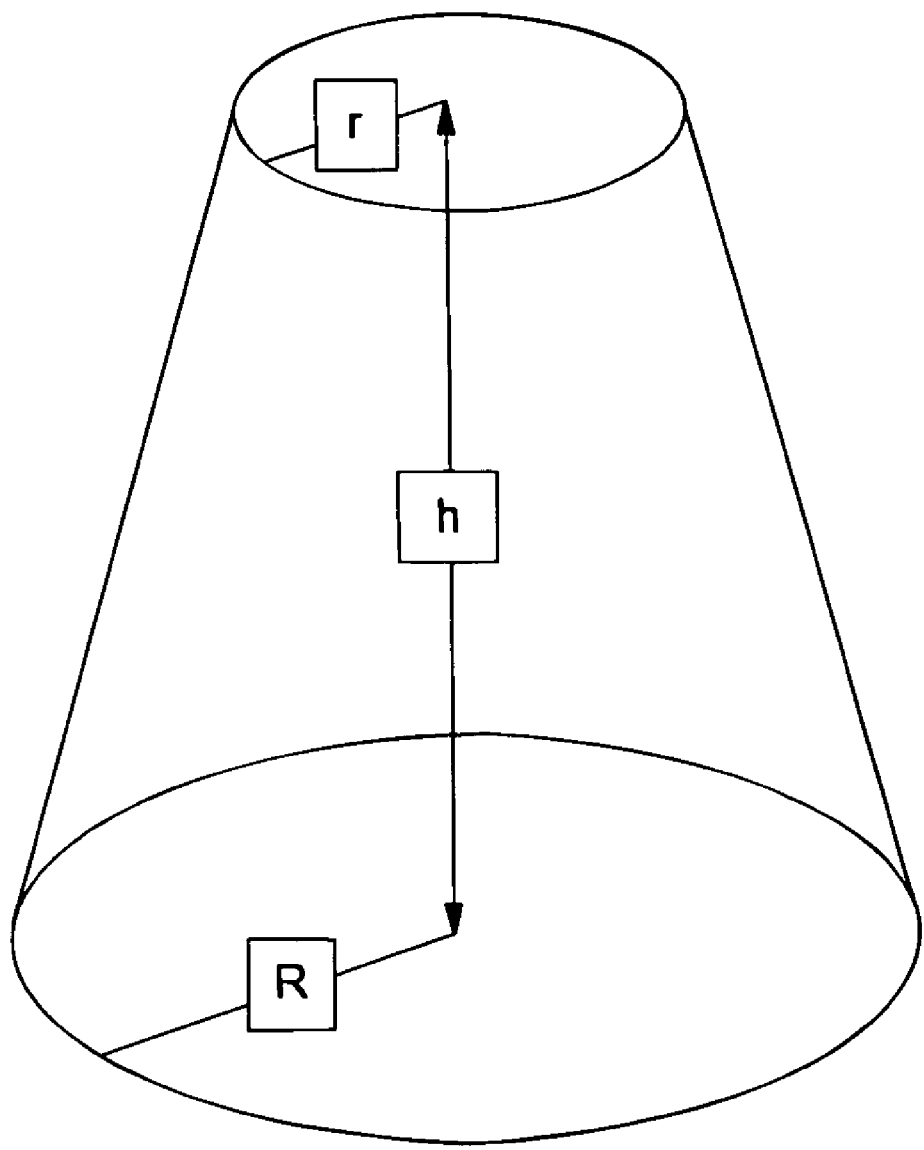
FIG. 3 is a schematic view of a representative dome shape formed on a substrate.

Referring to FIG. 3, within a unit cell, the final surface area ($A_F$) is comprised of the lateral surface area (L) of the frustum, the area of the top base ($A_t$), and the difference of the initial surface area ($A_I$) the area of the bottom base ($A_b$), and is given by:

$$A_{SF} = [\alpha(L) + \alpha(A_t)] + [(A_I) - \alpha(A_b)]$$

Where a, is the total number of domes in a give area; in the unit cell $\alpha=1$. The lateral surface area (see FIG. 3) is given by $L=\pi(r+R)s$ where $s=\sqrt{[R-r]^2+h^2}$. The area of top base ($A_t$) is given by $A_t=\pi r^2$ and the area of the bottom base ($A_b$) is given by $A_b=\pi R^2$. Thus, the final surface area is given by $A_{SF}=[\alpha(\pi(r+R)s)+\alpha(\pi r^2)]+[(A_I)-\alpha(\pi R^2)]$ where $A_I$=initial surface area.

Consider a three-dimensional structure as described herein with an initial length and width of 101.6 mm. Utilizing a 9.525 mm (⅜") male pin diameter in conjunction with a 15.875 mm (⅝") female hole. The following parameters apply:

| | |
|---|---|
| Length ($L_1$), mm | 101.6 |
| Width ($W_1$), mm | 101.6 |

| -continued | |
|---|---|
| # of "Domes" | 16 |
| Radius @ Dome Base, mm | 7.9375 |
| Radius @ Dome Top, mm | 4.7625 |
| Dome Height (h), mm | 12 |

Consequently, $$DR = \frac{A_{SF}}{A_I} = \frac{12639.849\,mm^2}{10322.56\,mm^2} = 1.222$$

Figure 4:
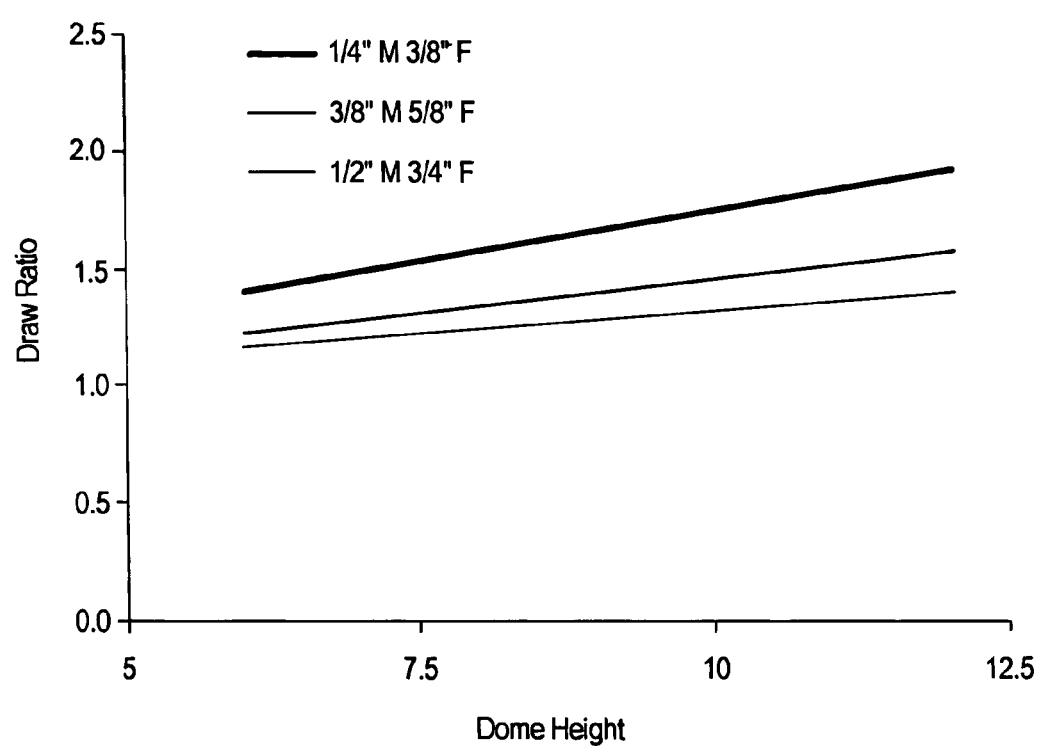
FIG. 4 is a graph of draw ratio as a function of dome size.

For a given substrate, the final draw ratio is a function of dome size. FIG. 4 shows that the final draw ratio can be as much as 3 for various pin diameters. These draw ratios are significantly higher than the strain to failure of the substrates. The properties of the test structure used to create the data shown in FIG. 4 are set forth in Table 1 below.

TABLE 1

| Sample | Fiber Type | Weight g/m² | Thickness (mm) | Fiber Cross Section | Fiber Diameter (μ) |
|---|---|---|---|---|---|
| Spunbond | PP | 160 | 0.46 | R | 40–50 |

Applicants contemplate that the projections or depressions within the substrate will have a height between 0.1–10.0 mm and a width between 0.1–100 mm.

Figure 5:
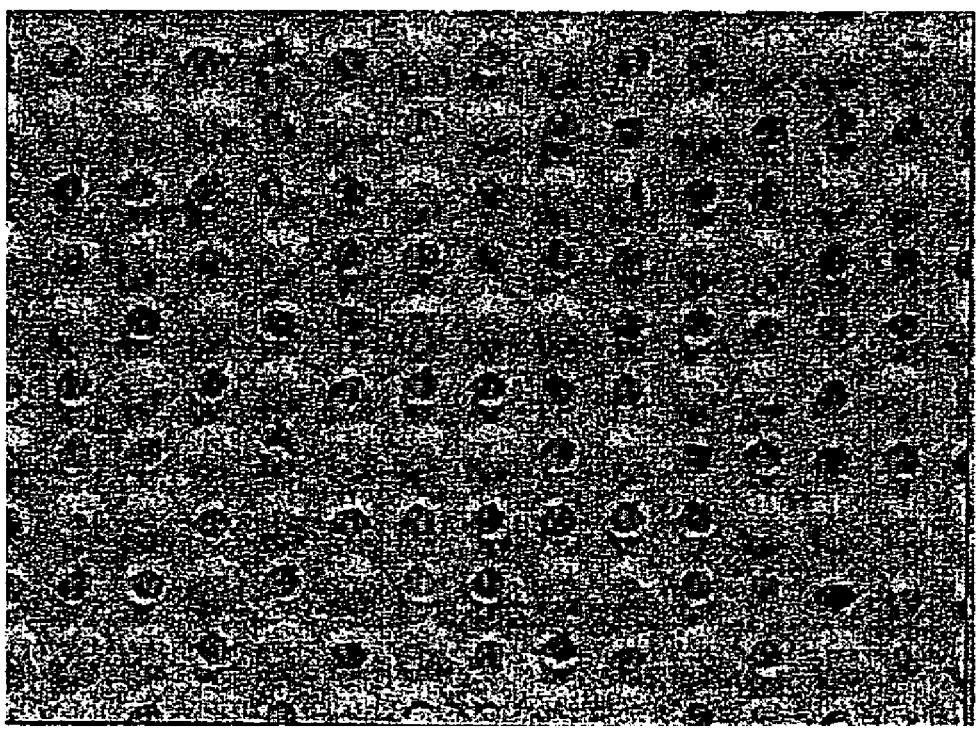
FIG. 5 is a top plan view of a sample deep molded structure with holes in the structure due to substrate failure.

Applicants believe that formability of the substrates described herein for use with the present invention are affected by the structure anisotropy (fiber orientation distribution, ODF, in nonwovens) as well as the drawability of individual fibers or filaments, and in the case of nonwovens the method of bonding. The strain to failure of the substrate tested at ambient is not an indicator. Applicants' invention allows the use of substrates with as little as 5.0% strain to failure and strains higher than 100%. Common anisotropic structures with strain to failures lower than 5.0% cannot be deep molded and holes are formed at moderate dome heights as shown in FIG. 5. The properties of the test structure shown in FIG. 5 are set forth in Table 2 below.

TABLE 2

| Sample | Fiber Type | Weight g/m² | Thickness (mm) | Fiber Cross Section | Fiber Diameter (μ) |
|---|---|---|---|---|---|
| Hydroentangled | PET | 100 | 1.0 | R | 20 |

Generally, applicants have discovered that the draw ratio will increase as a function of product thickness increases and pin diameter decreases.

For a single layer structure, the structure's stiffness and strength is a function of the properties of the constituent fibers in the structure as well as the weight per unit area (basis weight) of the samples. This is especially true for spunbonded nonwoven structures.

Maintaining the formed shape of the molded structure is of equal importance. There are no standard test methods for determining the compressive properties of formed deep molded structures. Applicants have tested a method that utilizes a constant rate of extension (CRE) tensile testing machine in compression mode with the following conditions:

| | |
|---|---|
| Platen Separation: | 10 mm |
| Crosshead Speed: | 1 mm/min to 40% strain |
| Specimen thickness: | measured under .005 kgf |
| Sample Size: | 10 cm² |

Figure 6:
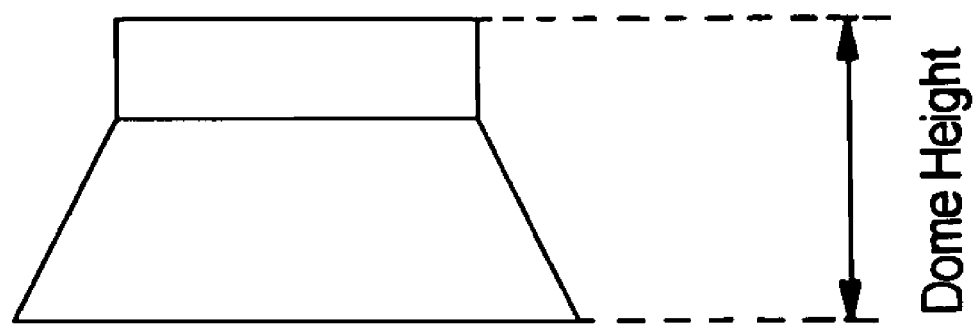
FIG. 6 is a side elevation view of typical dome deformation at high strain levels.
Figure 7:
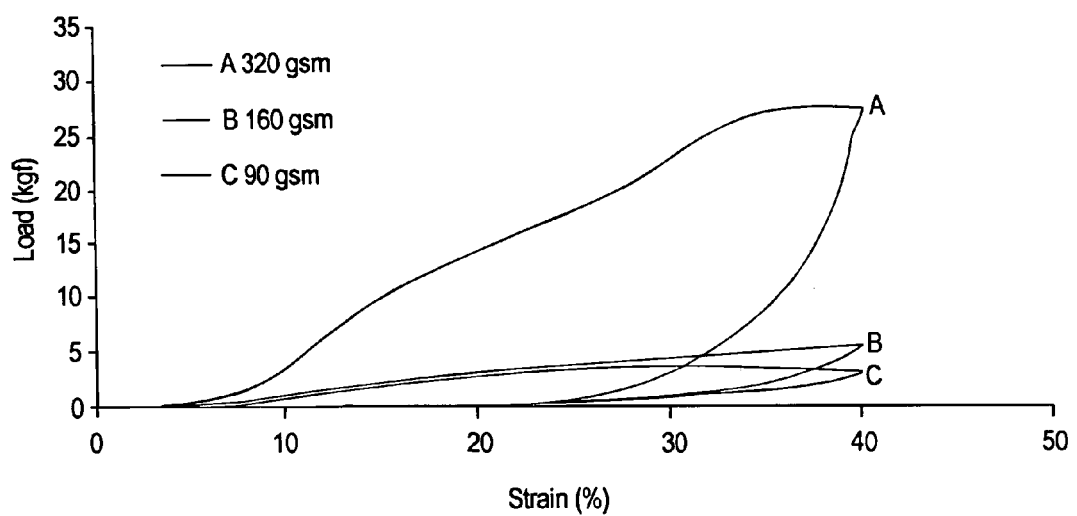
FIG. 7 is a graph of loading and unloading for spunbonded substrates at three different basis weights.

At a strain of approximately 40%, the dome projection changes from a more cylindrical shape to a more conical shape as shown in FIG. 6. The ability to recover to the original shape from this type of deformation was determined by cyclic loading. FIG. 7 shows typical loading unloading behavior of spunbonded samples at three different basis weights (e.g., 320 gsm; 160 gsm; and 90 gsm). Note that the energy absorption and stiffness of the deep molded structure increase rapidly with basis weight. It is also evident that no permanent deformation is evident under compression loading. The properties of the test structures used to create the data shown in FIG. 7 are set forth in Table 3 below.

TABLE 3

| Sample | Fiber Type | Weight g/m² | Thickness (mm) | Fiber Cross Section | Fiber Diameter (μ) |
|---|---|---|---|---|---|
| Spunbond | PP | 90 | 0.38 | R | 40–50 |
| Spunbond | PP | 160 | 0.46 | R | 40–50 |
| Spunbond | PP | 320 | 0.75 | R | 40–50 |

Figure 8:
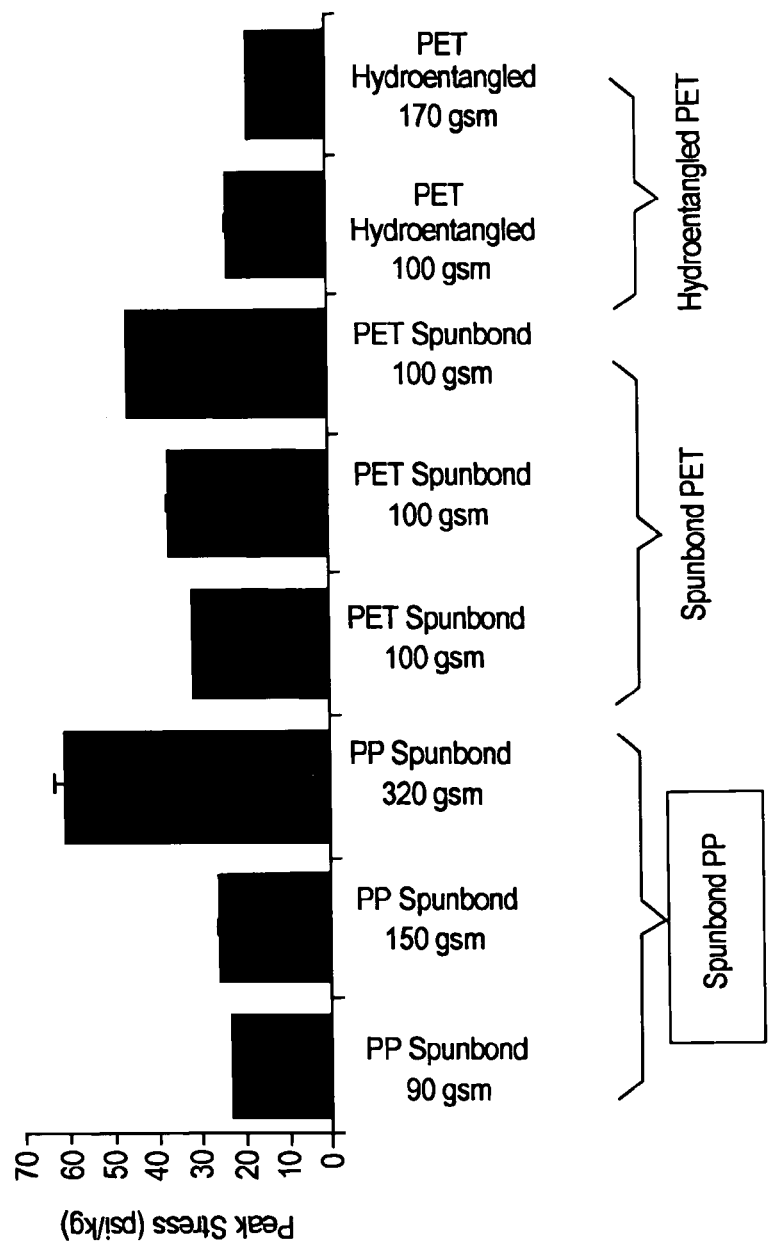
FIG. 8 is a bar graph of compression stiffness values for various deep molded structures formed from different nonwoven samples.

FIG. 8 shows the compressive stiffness of eight deep molded structures normalized by the weight of the specimens. It is evident that the stiffness increases with the basis weight of the specimens as seen for the PP samples. Note that these structures are composed of partially oriented fiber (POF) and are better suited for deep molding. These structures tend to form deeper and more uniform projections. Additionally, during the molding process the fibers go though solid state crystallization improving their mechanical properties. Note that the PET spunbonded samples out-perform the PP samples with the hydroentangled products providing the softest specimens. These were composed of fully drawn fibers and the molding process is not expected to result in improvements in the fiber properties. The properties of the eight test substrates shown in FIG. 8 are described in Table 4 below.

TABLE 4

| Sample | Fiber Type | Weight g/m² | Thickness (mm) | Fiber Cross Section | Fiber Diameter (μ) |
|---|---|---|---|---|---|
| Spunbond | PP | 90 | 0.38 | R | 40–50 |
| Spunbond | PP | 160 | 0.46 | R | 40–50 |
| Spunbond | PP | 320 | 0.75 | R | 40–50 |

Figure 9A:
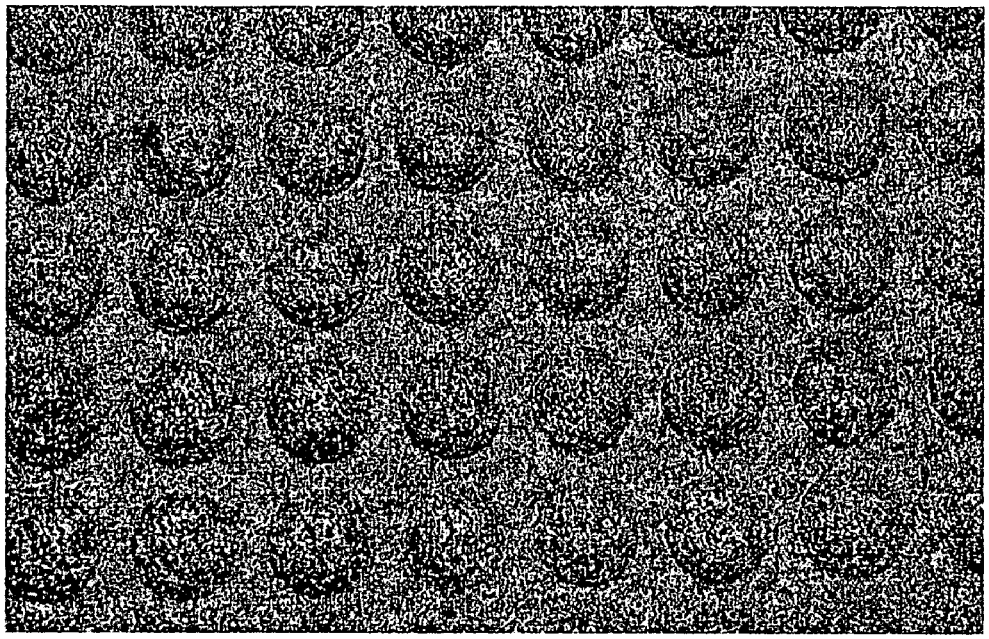
FIGS. 9A and 9B are photographs of a sample deep molded structure after twenty-five (25) launderings.
Figure 9B:
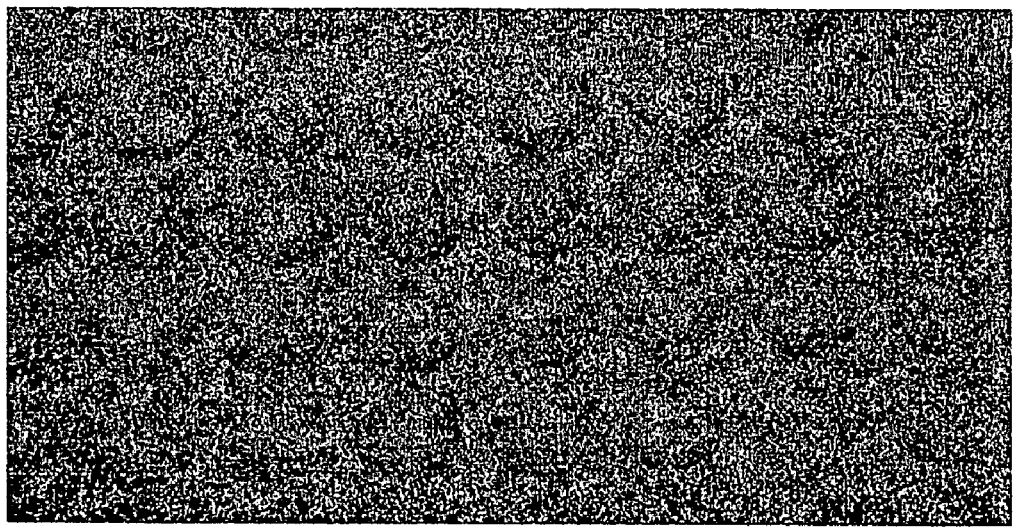

FIGS. 9A & 9B show the before and after photographs of a knitted fleece formed of 50/50 blend of cotton and multilament polyester fiber and laundered fifty (50) times. The shape and appearance can be seen to be retained very well. The properties of the test structure are as follows: 50/50 polyester cotton knitted fleece.

Summarily, the invention discovered by applicants is a three-dimensional deep molded product made from planar nonwoven fabrics formed from staple fibers or filaments of any size. Also, knitted and woven fabrics comprising fibers and/or filaments smaller than 100 microns in diameter are contemplated by the invention. Preferably, the filament and fiber diameter are about 1–20 microns. The best nonwoven structures are those with a random fiber orientation distribution. While common anisotropic structures can also be molded, the degree to which they can be drawn becomes more limited with increasing anisotropy. Tufted, stitch-bonded and flocked fabrics can also be used to make the deep molded product.

The stiffness of the structure can be controlled by employing larger diameter fibers and/or a higher basis weight. Higher porosities can be achieved by using thicker fibers. However, the overall flexibility of the structure will also reduce making it more difficult to cut. These attributes can be balanced to achieve the highest resilience, highest porosity, and highest flexibility.

The nonwoven web formation processes (e.g., carding, airlay, wetlay, spunbond and meltblown) typically lead to an oriented structure wherein the majority of fibers are parallel to the direction in which the web is being formed and collected (machine direction). The introduction of crimp into the fibers tends to randomize the orientation distribution locally which leads to improved moldability.

It will be understood that various details of the invention may be changed without departing from the scope of the invention. Furthermore, the foregoing description is for the purpose of illustration only, and not for the purpose of limitation—the invention being defined by the claims.

What is claimed is:

1. A three-dimensional flexible calender molded or thermo-formed deep molded non-woven fabric comprising a planar flexible textile non-woven substrate having a multiplicity of compressible projections extending from the planar surface which return to their shape after being substantially compressed, wherein the non-woven substrate is a non-meltblown non-woven fabric, manufactured from spunbonded or melt-bonded filaments and/or fibers with a diameter of less than 100 microns and having a constant anisotrophy ratio $f_p$ between −½ to +½ throughout the substrate to provide a generally constant random fiber orientation distribution throughout the substrate.

2. The non-woven fabric recited in claim 1 wherein the substrate is wholly or partially made up of a thermoplastic fiber or polymer with melting temperature in the range of 70 C to 450 C.

3. The non-woven fabric recited in claim 2 wherein the thermoplastic polymer is a co-polyetherester elastomer with long chain ether-ester units and short chain ester units joined head to tail through ester linkages.

4. The non-woven fabric recited in claim 2 wherein the thermoplastic polymer is a poly(ethylene terephthalate) or poly(trimethylene terephthlate).

5. The non-woven fabric recited in claim 2 wherein the thermoplastic polymer is selected from nylon 6, nylon 6,6, polypropylene or polyethylene.

6. The non-woven fabric recited in claim 2 wherein the thermoplastic fiber is homo-component, bicomponent, or multi-component.

7. The non-woven fabric recited in claim 2 wherein the thermoplastic fiber used in the substrate is selected from the group consisting of: polyesters, polyamides, thermoplastic copolyetherester elastomers, polyolefines, polyacrylates, and thermoplastic liquid crystalline polymers.

8. The non-woven fabric recited in claim 1 wherein the non-woven fabric has projections or depressions measuring 0.1 mm to 5 cm in height.

9. The non-woven fabric recited in claim 1 wherein the non-woven fabric comprises projections or depressions measuring between 0.1 mm and 100 mm in width.

10. The non-woven fabric recited in claim 1 wherein the projections have a frusto-conical shape.

11. The non-woven fabric recited in claim 1 wherein the non-woven fabric most suitably comprises filaments and/or fibers with diameters of about 1–20 microns for soft structures and 20–100 microns for more rigid structures.

12. The non-woven fabric recited in claim 1 wherein the non-woven fabric comprises partially oriented fibers and/or filaments.

13. The non-woven fabric recited in claim 1 wherein the non-woven fabric also contains a thermoset resin.

14. The non-woven fabric recited in claim 1 wherein the non-woven fabric is stiffened by nesting head-to-head or head-to-tail two or more layers of said network.

15. The non-woven fabric recited in claim 1 wherein the non-woven fabric can be stiffened by laminating a planar nonwoven, woven or knitted or other planar structure such as a film or a polymeric or metallic sheet to the fabric.

16. The non-woven fabric recited in claim 1 wherein the fiber comprises a tipped trilobal cross-section wherein one component melts at a lower temperature.

17. The non-woven fabric recited in claim 1 wherein the fiber comprises a sheath/core cross-section wherein the sheath melts at a lower temperature than the core.

18. The non-woven fabric recited in claim 1 wherein the fiber comprises a side-by-side cross-section wherein one sheath melts at a lower temperature than the other.

19. A three-dimensional flexible calender molded or thermo-formed deep molded non-woven fabric comprising a molded planar flexible textile non-woven substrate having a multiplicity of compressible projections extending from the planar surface which return to their shape after being substantially compressed, wherein the non-woven substrate is a non-meltblown non-woven fabric manufactured from spunbonded or melt-bonded filaments and/or fibers with a diameter of less than 100 microns and having a constant anisotrophy ratio $f_p$ between –½ to +½ throughout the substrate to provide a generally constant random fiber orientation distribution throughout the substrate, and where the fiber-to-fiber crossover intersections are at least partially fused during the molding process to provide substantial rigidity to the flexible textile substrate.

20. The non-woven fabric recited in claim 19 wherein the substrate is wholly or partially made up of a thermoplastic fiber or polymer with melting temperature in the range of 70 C to 450 C.

21. The non-woven fabric recited in claim 20 wherein the thermoplastic polymer is a co-polyetherester elastomer with long chain ether-ester units and short chain ester units joined head to tail through ester linkages.

22. The non-woven fabric recited in claim 20 wherein the thermoplastic polymer is a poly(ethylene terephthalate) or poly(trimethylene terephthlate).

23. The non-woven fabric recited in claim 20 wherein the thermoplastic polymer is selected from nylon 6, nylon 6,6, polypropylene or polyethylene.

24. The non-woven fabric recited in claim 20 wherein the thermoplastic fiber is homo-component, bicomponent, or multi-component.

25. The non-woven fabric recited in claim 20 wherein the thermoplastic fiber used in the substrate is selected from the group consisting of: polyesters, polyamides, thermoplastic copolyetherester elastomers, polyoefines, polyacrylates, and thermoplastic liquid crystalline polymers.

26. The non-woven fabric recited in claim 19 wherein the non-woven fabric has projections or depressions measuring 0.1 mm to 5 cm in height.

27. The non-woven fabric recited in claim 19 wherein the non-woven fabric comprises projections or depressions measuring between 0.1 mm and 100 mm in width.

28. The non-woven fabric recited in claim 19 wherein the projections have a frusto-conical shape.

29. The non-woven fabric recited in claim 19 wherein the non-woven fabric comprises partially oriented fibers and/or filaments.

30. The non-woven fabric recited in claim 19 wherein the non-woven fabric also contains a thermoset resin.

31. The non-woven fabric recited in claim 19 wherein the non-woven fabric is stiffened by nesting head-to-head or head-to-tail two or more layers of said fabric.

32. The non-woven fabric recited in claim 19 wherein the non-woven fabric can be stiffened by laminating a planar nonwoven, woven or knitted or other planar structure such as a film or a polymeric or metallic sheet to the fabric.

33. The non-woven fabric recited in claim 19 wherein the fiber comprises a tipped trilobal cross-section wherein one component melts at a lower temperature.

34. The non-woven fabric recited in claim 19 wherein the fiber comprises a sheath/core cross-section wherein the sheath melts at a lower temperature than the core.

35. The non-woven fabric recited in claim 19 wherein the fiber comprises a side-by-side cross-section wherein one side melts at a lower temperature than the other.

* * * * *